Figure 3:
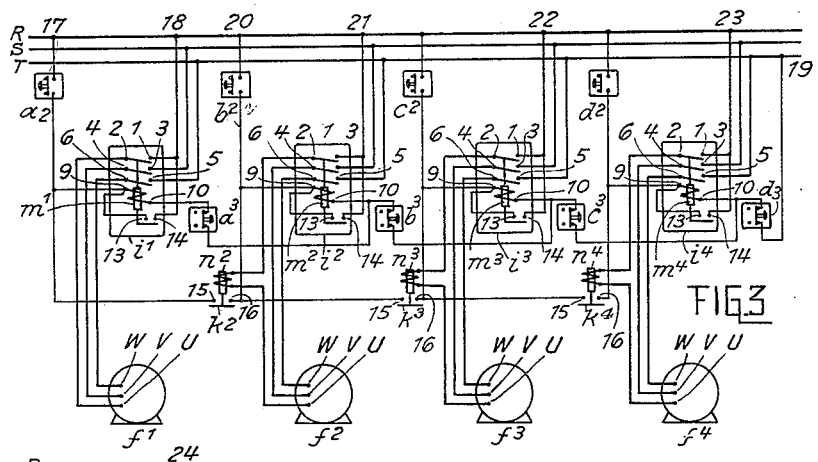

June 20, 1933.   W. NACKEN   1,914,833
MULTIPLE WIRE DRAWING MACHINE
Filed June 2, 1931   3 Sheets-Sheet 1
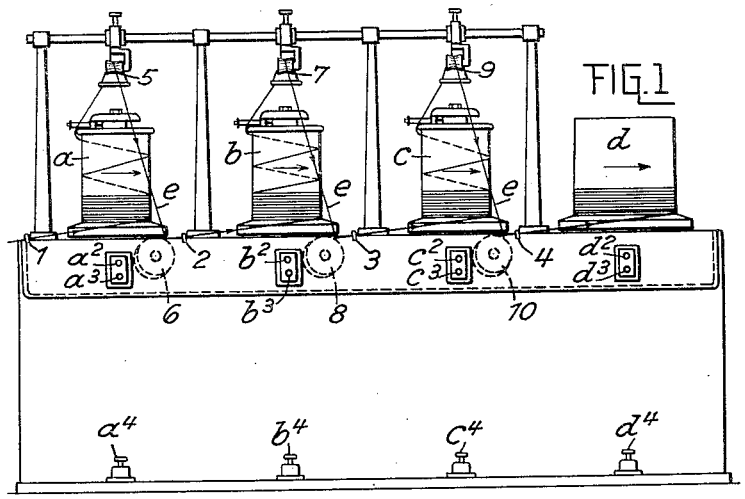
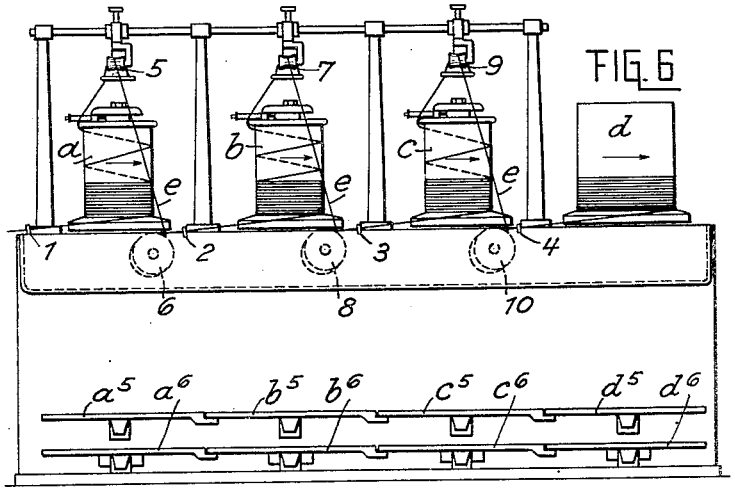
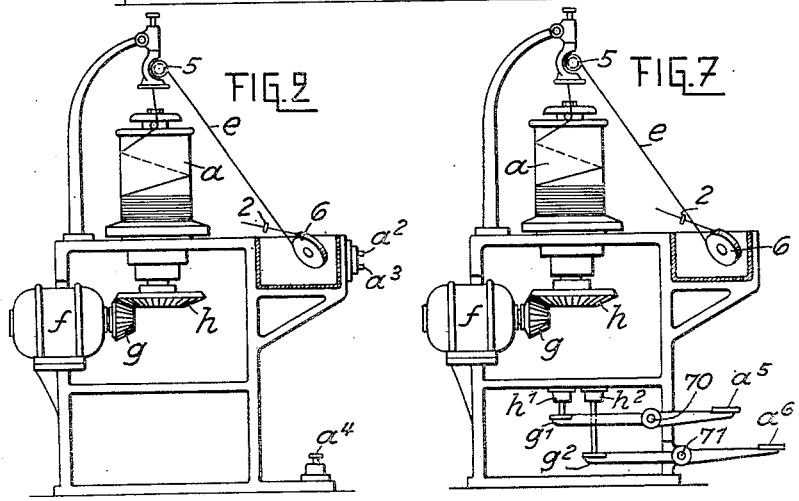
WALTHER Nacken
INVENTOR

WALTHER NACKEN
INVENTOR

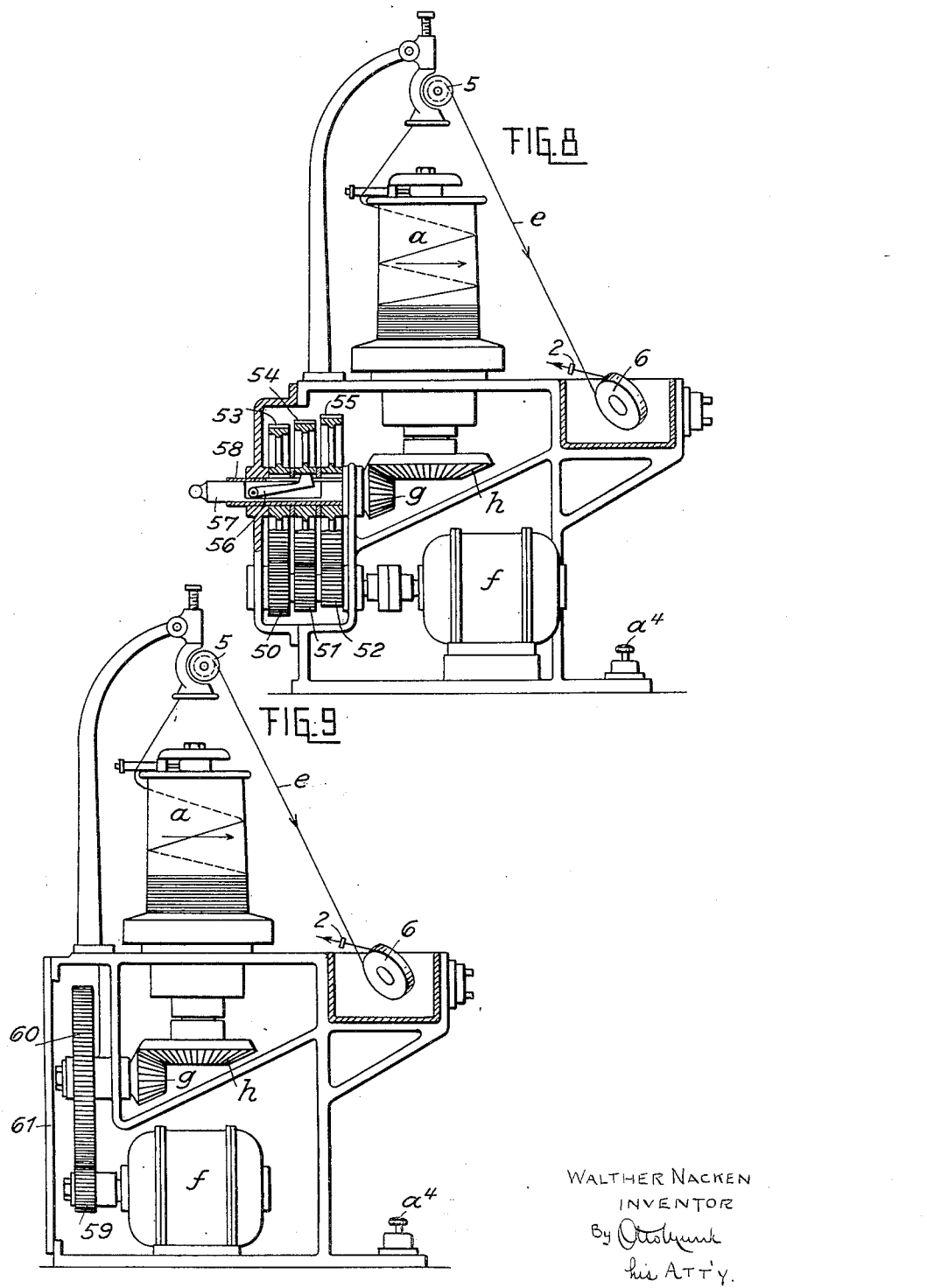

Patented June 20, 1933

1,914,833

UNITED STATES PATENT OFFICE

WALTHER NACKEN, OF GRUNA, GERMANY

MULTIPLE WIRE DRAWING MACHINE

Application filed June 2, 1931. Serial No. 541,587, and in Germany November 17, 1930.

The invention relates to multiple wire-drawing machines.

There are already known multiple wire-drawing machines in which every individual drum is driven from the main-shaft of the machine through a clutch and in which by disconnecting or connecting one drum all the preceding drums are likewise disconnected or connected, while the following drums remain unaffected.

The object of the invention is to effect such a disconnection or connection in a simple manner in a wire-drawing machine in which the various drums are driven individually or separately, for instance by an electric motor. With this end in view, the invention consists substantially in making provisions that on stopping or starting the driving motor of one drawing drum, the driving motors of all the preceding drums are likewise stopped or started while the following driving motors and thus the drums driven by them remain unaffected.

A number of embodiments of my invention are, by way of example, illustrated in the accompanying drawings.

Figure 4:
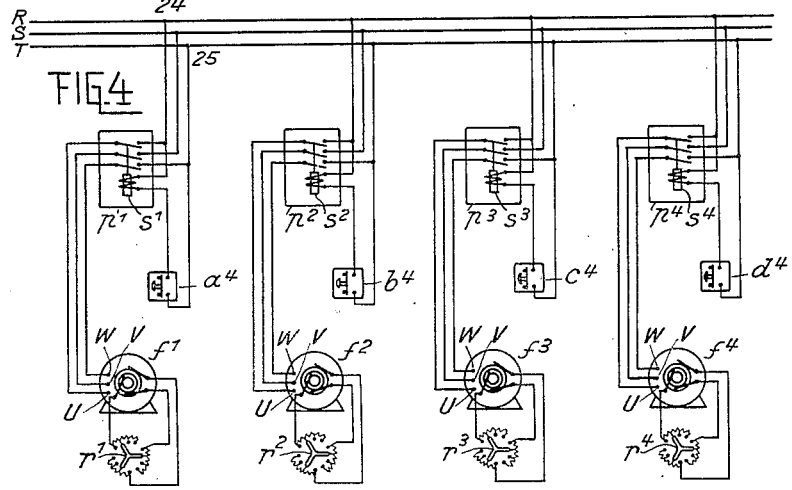
Figure 5:
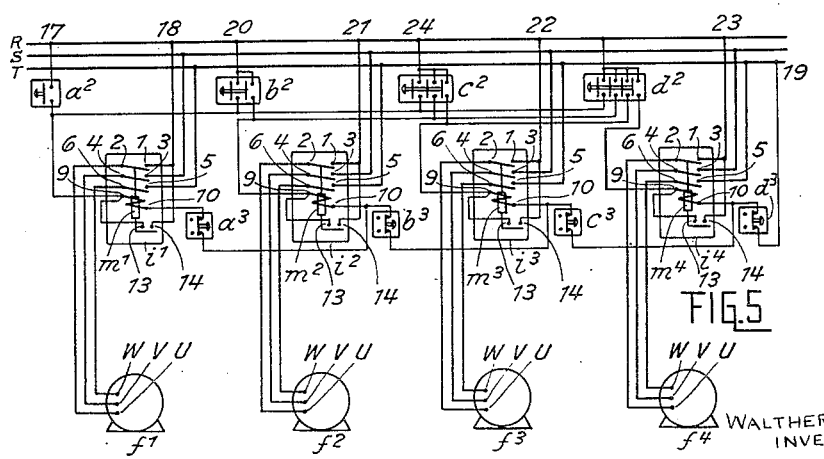

In the drawings is:

Fig. 1, a side-elevation of an improved wire-drawing machine in which the individual drive of the drawing drums is effected by electric motors, Fig. 2, a front-elevation of this machine, Fig. 3, a diagram of connections for the control of the electric motors of the machine shown in Figs. 1 and 2 by means of push buttons operated by hand, Fig. 4, a diagram of further connections for the control of the electric motors of the machine shown in Figs. 1 and 2, Fig. 5, a diagram of connections for a modified construction of the push button connection according to Fig. 3, Fig. 6, a modification with a mechanical control of the electric motors in side-elevation, Fig. 7, the same in front-elevation, Fig. 8, a sectional front-elevation of a machine in which the rotation of each driving motor is transmitted to the respective drum by a transmission gear, and Fig. 9, a similar front-elevation of the machine with a modified transmission gear between the driving machine and the respective drum.

Like parts are indicated by like letters and numerals of reference throughout all the figures of the drawings.

In the examples illustrated, a wire-drawing machine with four drawing drums is shown, but it will be readily understood that any other suitable number of drums may be employed.

In each of the machines, $a$, $b$, $c$, and $d$ designate the four drawing drums, of which the last drum $d$ also serves as winding-up reel for the finished wire. $e$ designates the wire which by means of the said drums is drawn through a series of dies or draw plates 1, 2, 3 and 4 with drawing holes of successively smaller diameters, and by means of guide rollers 5, 6, 7, 8, 9 and 10 led from drum to drum and drawn out to the desired diameter.

Each drawing drum is driven by a separate driving motor, in the case illustrated by an electric motor $f$, through the bevel wheels $g$ and $h$.

In the embodiment of the invention illustrated in Figs. 1 and 2, the electric motors $f^1$, $f^2$, $f^3$, $f^4$ are adapted to be switched on and off by an electrical connection controlled by push buttons and which is diagrammatically shown in Figs. 3 and 4 of the drawings.

In this embodiment, two push buttons adapted to be operated manually $a^2$, $a^3$, $b^2$, $b^3$, $c^2$, $c^3$, $d^2$, $d^3$ are mounted on the frame in front of each drum, as well as one button each $a^4$, $b^4$, $c^4$ and $d^4$ mounted on the base-plate and adapted to be operated by the foot, which operate in accordance with the diagrams shown in Figs. 3 and 4.

Referring to these figures, R, S, T are the main lines of a three-phase system to which are connected the motors $f^1$, $f^2$, $f^3$ and $f^4$ at W, V, U. To each motor are assigned the push buttons $a^2$, $b^2$, $c^2$, $d^2$ for the connection as well as the push buttons $a^3$, $b^3$, $c^3$, $d^3$ for the disconnection. To each motor are furthermore assigned a contactor $i^1$, $i^2$, $i^3$, $i^4$. Each of the motors $f^2$, $f^3$ and $f^4$ is also connected to a relay $k^2$, $k^3$, $k^4$. The said push buttons are constructed in any well known manner so that their movable contacts are kept in a certain position, for instance by means of suitable springs and after the performance of their action they are brought back to this position. The switch-in push buttons $a^2$, $b^2$ are so constructed that they usually take the open position, as shown in Figure 3 and which, after each closing action, open again automatically while the switch-off buttons $a^3$, $b^3$ are so constructed that, as also shown in Figure 3, they usually stand in closed position and return automatically to the closed position after each opening. The mode of operation of this system of connection is as follows:—

Assuming that all the motors are at rest and the push button $a^2$ for starting the motor $f^1$ is now depressed, the current will flow from the terminal 17 of the main line R across the push button $a^2$ to the terminal 9 of the contactor $i^1$, through the coil of the magnet $m^1$, hence across terminal 10 to the push button $a^3$, and across the push buttons $b^3$, $c^3$, and $d^3$ to the terminal 19 of the line T. The core inside the energized coil of the magnet $m^1$ is then attracted and the contacts 1, 3, 5 of the contactor $i^1$ closed and the motor $f^1$ started. Simultaneously, the auxiliary current contacts 13 and 14 of the contactor $i^1$ are closed by the attraction of the core by the energized coil of the magnet $m^1$ so that now on releasing the push button $a^2$, the electric current from the terminal 18 of the line R flows back to the terminal 19 of the line T, across the contacts 14 and 13 of the contactor $i^1$, and also across the terminals 9 and 10 around the coil of the magnet $m^1$ and across the push buttons $a^3$, $b^3$, $c^3$, $d^3$. The contactor $i^1$ is thus held closed also when the push button $a^2$ is released and the motor $f^1$ is kept in operation.

If now the push button $a^3$ for switching off the motor $f^1$ is depressed, the auxiliary circuit is broken, the core of the magnet $m^1$ drops off and breaks the contacts 1, 3, 5 of the contactor $i^1$ and thus disconnects and stops the motor $f^1$. The contacts 13 and 14 are simultaneously opened.

If the start button $b^2$ is depressed in order to start the motor $f^2$, the current passes from the terminal 20 of the line R across the terminals 9 and 10 of the contactor $i^2$ and energizes the coil and attracts the core of the magnet $m^2$. In this way, the contacts 1, 3 and 5 of the contactor $i^2$ and simultaneously the contacts 13 and 14 of this contactor are closed. By the closing of the contacts 1, 3 and 5, the motor $f^2$ is started while simultaneously through the closing of the contacts 13 and 14 the auxiliary current returns from the terminal 21 of the line R across the terminals 14, 13, 9, 10, the push buttons $b^3$, $c^3$ and $d^3$ to terminal 19 of the line T. In this way, the contactor $i^2$ remains closed also, when the button $b^2$ is released. The main current line from the terminal 2 of the contactor $i^2$ to the terminal U of the motor $f^2$ is passed through the coil surrounding the core of the magnet $n^2$ of the relay $k^2$. The said core is thus attracted and the two contacts 15 and 16 of this relay are closed. Even when the button $b^2$ is now released, the auxiliary current from the terminal 21 of the line R, thus flows across the contacts 14, 13 and terminal 9 of the contactor $i^2$ across the contacts 16, 15 of the relay $k^2$, then across the terminals 9, 10 of the contactor $i^1$ and across the stop buttons $a^3$, $b^3$, $c^3$, $d^3$ back to terminal 19 of the line T, so that, exactly as before, on operating the button $a^2$, the contactor $i^1$ is closed and the motor $f^1$ is also started. By depressing the push button $b^2$, the motor $f^2$ is thus first started and then automatically the motor $f^1$. From the foregoing it will be seen that the relay $k^2$ works as a delay switch, that means the motor $f^1$ is put in operation through the motor $f^2$ through the said action of the relay $k^2$ only after the motor $f^2$ has transgressed the peak of the rush of current.

If now the push button $b^3$ for stopping the motor $f^2$ is depressed, the motor $f^2$ is stopped by the dropping out of the contacts 1, 3 and 5 of the contactor $i^2$, exactly as the motor $f^1$ was stopped before by depressing the push button $a^3$. The relay $k^2$ is thus instantaneously de-energized and the contacts 15 and 16 opened as well as the contact $i^1$, and the motor $f^1$ also stops. By depressing the push button $a^3$ of the first motor only, the motor $f^1$ is, however, stopped in this case also, while motor $f^2$ continues to run, since contactor $i^2$ remains closed.

The corresponding contacts for the motors $f^3$ and $f^4$ operate in exactly the same manner, as will readily be understood from Fig. 3 of the drawings. When starting or stopping the motor $f^3$ the motors $f^2$ and $f^1$ will thus be automatically started or stopped, while the motor $f^4$ remains unaffected. When the motors $f^2$ and $f^1$ start running the relays $k^3$ and $k^2$ again operate as delay switches as has been described in connection with the relay $k^2$ and the automatic starting action of the motor $f^1$ through the motor $f^2$; that means the motor $f^2$ is put into operation by means of the relay $k^3$ from the motor $f^3$ and thereafter from the motor $f^1$ by means of the relay $k^2$ only after the motors $f^3$ and $f^2$ have already transgressed the peak of the rush of current.

Assuming that all the motors are running and, for instance, the stop button $b^3$ is depressed, the motor $f^2$ as well as the motor $f^1$ is stopped, as explained before. The running motors $f^3$ and $f^4$ are, however, not affected, because the auxiliary current flows as before from the terminal 22 of the line R across the contacts 14, 13 and the terminals 9, 10 around the coil of the magnet $m^3$ of the contactor $i^3$ and across the stop buttons $c^3$ and $d^3$ to terminal 19 of the line T, and also from terminal 23 of the line R across contactor $i^4$ and push button $d^3$ to the same terminal 19 of the line T. Both contactors thus remain closed and the motors $f^3$ and $f^4$ remain in operation, as required.

The foot operated push buttons $a^4$, $b^4$, $c^4$, $d^4$ serve to impart a slow speed to each drum separately and independently of the others when threading or inserting a fresh wire into the machine, so that the end of the wire gripped by the well known pliers or pincers is not broken when a fresh wire is drawn into the machine. The push buttons $a^4$ $b^4$ are constructed in the same way as the above mentioned push buttons $a^2$, $b^3$, namely, they take usually, as shown in Figure 4, the open position and return after each action to the open position. By depressing one of these push buttons, each drum is thus slowly rotated independent of the others, so that the drawing in takes place extremely smoothly and without a jerk. These push buttons are preferably adapted to be operated by the foot in order that the operator may have his hands free during the threading in, but it will be understood that it might also be adapted to be operated manually.

These push buttons operate in the manner illustrated in Fig. 4 of the drawings.

In this figure, R, S, T are again the main current supply lines of the machine, while $f^1$, $f^2$, $f^3$ and $f^4$ are again the motors pertaining to the various drums, and $p^1$, $p^2$, $p^3$, $p^4$ the contractors of this system of connection. Rheostats $r^1$, $r^2$, $r^3$, $r^4$ are connected to the motors. When depressing one of the push buttons $a^4$, $b^4$, $c^4$, or $d^4$, for instance the push button $a^4$, the current flows from terminal 24 of the line R through the coil of the magnet $s^1$ of the contactor $p^1$ across the push button $a^4$ to the terminal 25 of the line T. The contactor $p^1$ then closes and the pertaining motor $f^1$ is switched in. Owing to the rheostat $r^1$, the motor does not start at full speed and its starting speed may be reduced to 20 to 30 percent of its rated speed. It is thus possible to start each drawing drum slowly by itself by depressing the respective foot operated push button $a^4$ to $d^4$ for inserting or drawing in the wire from a fresh coil. On releasing the foot operated push button $a^4$, the magnet $s^1$ of the contactor $p^1$ is de-energized, the contactor opens and the motor stops. After the operator has inserted the wire in the well known manner, he is able to take the machine into regular service by depressing one of the start buttons $a^1$, $a^2$, $a^3$, $a^4$. Figs. 1, 2 and 3 in the manner described.

The push buttons $b^4$, $c^4$ and $d^4$ and the respective motors $f^2$, $f^3$, and $f^4$ are equipped in a similar manner as described with reference to the push button $a^4$.

The two switching systems according to Figs. 3 and 4 may be combined with each other in any suitable manner. Further contacts may be also provided in the contactors of the system according to Fig. 3 which are adapted to short-circuit or to cut out stepwise the rotor resistances of the motors used for drawing in a fresh wire according to the wiring system of Fig. 4, because the normal operation of the motors must of course be effected with the said resistances short-circuited.

It will be readily understood that the apparatus described and shown is only an example, and that it may be modified in various ways as long as the desired object is attained, viz that when one motor is switched in or out, all the motors ahead of it are simultaneously switched in or out. The wiring must of course be adapted to the various types of electric motors. It will be different for direct current or single-phase alternating current motors than for three-phase motors, and for squirrel-cage motors different from slip-ring motors. The mode of operation of the relays or the contactors will in such cases naturally also be different, as is well known for every one skilled in the art. Instead of the relays $k^2$, $k^3$, $k^4$ through which the next motor is always started by the current impulse produced by the preceding motor, mechanical means may, of course, also be provided in such a way that, for instance by centrifugal governors customary in the art, each motor on attaining a predetermined speed closes a contact through which the preceding motor is operated in identical manner. Such apparatus may have in many cases the advantage of greater reliability over relays operated by current impulses.

In Fig. 5 of the drawings is shown another system of connection for attaining the same result, in which the starting from motor to motor is not effected by the motor or the circuit of the motor, but in which the motors are switched in by special switches in such a way that the push buttons pertaining to the individual drums are so designed that by the push button $a^2$ only the drum $a$ is started, by the push button $b^2$ the drums $a$ and $b$, and so on. In this case, the lines of the individual motors are so connected that for every drawing drum there is provided a push button designed to start the motor of this drum as well as the motors of the preceding drums. A hoop or the like may also be provided by means of which all push buttons may be depressed simultaneously so as to start the pertaining motor as well as the preceding motors whereas the subsequent motors remain unaffected. It is obvious that instead of push buttons there may be also used other suitable switching means for the purposes of this invention, such as for instance drum—or similar switches.

Referring to Fig. 5 of the drawings, R, S, T are again the main current supply lines and $f^1$, $f^2$, $f^3$, $f^4$ the motors for driving the various drums. To each motor is again assigned a start button $a^2$, $b^2$, $c^2$, $d^2$ as well as a stop button $a^3$, $b^3$, $c^3$, $d^3$, also a contactor $i^1$, $i^2$, $i^3$, $i^4$. By depressing or rotating the start button $a^2$ in the circuit of the first motor, the auxiliary current flows from the terminal 17 of the phase wire R in the manner described through the coil of the magnet $m^1$ of the contactor $i^1$ and across the stop buttons $a^3$, $b^3$, $c^3$, $d^3$ back to the terminal 19 of the phase wire T. The contactor $i^1$ is then operated in the manner described before. The main contacts 1, 3, 5 are then closed and the motor $f^1$ is started. Simultaneously, the auxiliary contacts 13, 14 of the contactor are closed so that, on releasing the push button $a^2$, the auxiliary current now flows from the terminal 18 of the phase wire R across the contacts 14, 13 and the terminals 9, 10 of the contactor across the stop buttons $a^3$, $b^3$, $c^3$, $d^3$ back to terminal 19. The contactor $i^1$ thus remains closed and the motor $f^1$ continues to run. Only by depressing one of the stop buttons $a^3$, $b^3$, $c^3$, $d^3$, the auxiliary circuit is broken and the contactor drops out, whereby the motor $f^1$ is stopped.

If, on the other hand, the start button $c^2$ is depressed, the auxiliary current flows from the terminal 24 of conduit R across all three contacts of the push button $c^2$ to the three contactors $i^1$, $i^2$, $i^3$. All these contactors are operated in the same manner so that the three motors $f^1$, $f^2$, $f^3$ are started, while on depressing the stop push button $a^3$ only motor $f^1$, on depressing stop button $b^3$ only the motors $f^1$, $f^2$ are cut out while the motor $f^3$ continues to run. The motor $f^4$ is not affected at all, and remains entirely untouched.

In this way, the requirement is also complied with that on switching a motor out or in, all motors ahead of it are likewise switched out or in, while the following ones remain unaffected. In this case also the individual contactors $i^1$, $i^2$, $i^3$, $i^4$ may be equipped with retarding devices in order that the motors should not be started simultaneously but in succession for the purpose of avoiding violent current surges.

With this arrangement may, of course, be combined the arrangement for obtaining a slow or inching speed for each motor for the purpose of inserting a fresh wire into the machine.

The operation of the push buttons may also be effected mechanically. Suitable apparatus for this purpose is illustrated by way of example in Figs. 6 and 7 of the drawings.

Referring to these figures, it will be observed that to each drawing drum there is assigned a pair of treadles $a^5$, $a^6$, $b^5$, $b^6$, $c^5$, $c^6$ and $d^5$, $d^6$. These treadles are adapted to rock upon the shafts 70 and 71 and are so designed that the left-hand end of each treadle extends across the right-hand end of the preceding treadle, so that on depressing the treadle $b^5$ or $b^6$, for instance, the treadles $a^5$ and $a^6$ respectively are automatically depressed also, while the treadles $c^5$ and $d^5$ and $c^6$, $d^6$ remain unaffected.

On referring to Fig. 7 of the drawings, it will be noticed that to each treadle is assigned a push button $h^1$ and $h^2$, respectively, against which presses the extended end $g^1$ and $g^2$, respectively, of the corresponding treadles. The push buttons $h^1$ and $h^2$ are in their construction and connection identical with the push buttons $a^2$, $b^2$, $c^2$, $d^2$ and $a^3$, $b^3$, $c^3$, $d^3$ of Fig. 3. The wiring diagram for the push buttons $h^1$ and $h^2$ of each motor of Figs. 6 and 7 thus corresponds with that of Fig. 3, with the only difference that the relays $k^2$, $k^3$ and $k^4$ of Fig. 3 are missing. It appears therefore redundant to show a diagram of connections for the Figs. 6 and 7.

Since on depressing the treadle $c^5$ of Fig. 6 for instance the treadles $b^5$ and $a^5$ are simultaneously depressed, the push buttons $h^1$ pertaining to each treadle are thus simultaneously rendered operative and therefore the respective electric motors $f^1$, $f^2$ and $f^3$ started, in the manner described with reference to Fig. 3 of the drawings. The treadles $a^5$, $b^5$, $c^5$ and $d^5$ serve for stopping the motor by means of the respective push buttons $h^2$, in the manner likewise described with reference to Fig. 3. By depressing one of the treadles $a^5$—$d^5$ or $a^6$—$d^6$, the corresponding motors as well as the motors ahead are thus cut in or out, while the remaining motors remain unaffected. In this way, all the stop and start buttons are mechanically interconnected so that the object of this invention is attained when switching off or on one of the drums. It will be readily understood that this result might equally well be brought about by manually operated levers or the like. It is only necessary that on operating one of the foot or hand levers, the preceding levers should be operated at the same time, while the following levers remain inoperative.

In order to enable the speed of the draw drums in the arrangements described to be varied, in the event, for instance, of a harder material for the wire being employed or a change being made in the stepping of the dies or draw plates, the ratio gear shown by way of example in Fig. 8 of the drawings may be arranged between the motor $f$ of each drum and the drum.

In the construction illustrated in Fig. 8, there are on the shaft driven by the motor $f$ keyed three spur wheels 50, 51 and 52, which engage the spur wheels 53, 54, 55. The latter may by means of a spring-controlled key 56 pivotally mounted on a bushing 57, be coupled at will with the tubular shaft 58 driving the bevel wheel $g$, so that by a suitable displacement of the bushing 57 within the shaft 58 the drawing drum may be driven at different speeds while the speed of the motor remains constant.

In the embodiment of my invention illustrated in Fig. 9, a detachable pinion 59 is mounted on the shaft of each motor $f$ and gears with a spur wheel 60 which in its turn is detachably mounted on the shaft of the bevel wheel $g$. The box in which the pair of gear wheels 59, 60 is accommodated, is closed by a cover 61, so that after removal of this cover 61, the pair of gear wheels 59, 60 may be substituted by another pair of wheels of a different ratio of transmission, and thus the speed of the respective drum be changed as desired.

This variation of the speed may, of course, also be brought about by other means well known in the art which require no description or illustration. This is, for instance, possible by employing variable-speed motors, or by inserting resistances in circuit, or in the case of three-phase motors by changing the frequency of the current, or by connecting a resistance ahead of the whole machine. These two latter kinds of speed regulation are particularly advantageous for the reason that the speed of the individual motors is not varied by inserting separate resistances or by varying the speed of the individual drums by the insertion of different ratio gears, but because by varying the frequency of the three-phase current or the resistance connected ahead of the entire machine, the speed of all the motors is varied exactly in the same ratio, so that the ratios of the speeds of the individual motors to one another will remain the same and only the entire machine will run faster or slower.

I claim as my invention: —

1. In a multiple wire drawing machine, in combination, a plurality of drawing dies, a plurality of drawing drums cooperating with said dies, a separate electro-motor for driving each of said drums, means for each motor adapted to switch out and switch in the motor, said switching means being constructed and connected in circuit so that upon operation of the switching in or switching out means, respectively, of one motor, the switching in or switching out means, respectively, of the preceding motors are also operated, whereas the switching means of the following motors remain unaffected and means adapted to switch in the next motor then only when the previously switched in motor has already passed beyond the peak of the rush of current.

2. In a multiple wire drawing machine, in combination, a plurality of drawing dies, a plurality of drawing drums cooperating with said dies, a separate electromotor for driving each of said drums, means for each motor adapted to switch out and to switch in the motor, said switching means being constructed and connected in circuit so that upon operation of the switching in or switch-out means, respectively, of one motor, the switching in or switching out means, respectively, of the preceding motors are also operated, whereas the switching means of the following motors remain unaffected, and electric means comprising relays provided between each two succeeding motors, and adapted to switch in the next motor by a current impulse of the previously switched in motor being imparted to the said relay, after the rush of current of the latter motor has passed beyond its peak.

3. In a wire-drawing machine, in combination, a plurality of drawing dies, a plurality of drawing drums, cooperating with said dies, a separate electric motor for driving each of said drums, switching means for stopping and starting, respectively, each motor and so connected in circuit that by operating the switch of a motor the preceding motors are also stopped and started, respectively, and switching means connected in the circuit of each motor and adapted to start each motor independently of all the other motors.

4. In a wire-drawing machine, in combination, a plurality of drawing dies, a plurality of drawing drums cooperating with said dies, a separate electric motor for driving each of said drums, switching means for stopping and starting, respectively, each motor and so connected in circuit that by operating the switch of a motor the preceding motors are also stopped and started, respectively, switching means connected in the circuit of each motor and adapted to start each motor separately, and rheostats connected with the motors and controlled by said switching means to reduce the speed of the motor and its starting torque.

In testimony whereof I have affixed my signature.

WALTHER NACKEN.